United States Patent
Chan

(10) Patent No.: US 7,372,381 B2
(45) Date of Patent: May 13, 2008

(54) PROGRAMMABLE SERIALIZER FOR A VIDEO DISPLAY

(75) Inventor: Chung S R Chan, Coppell, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/480,034

(22) Filed: Jun. 30, 2006

(65) Prior Publication Data

US 2007/0002895 A1   Jan. 4, 2007

Related U.S. Application Data

(60) Provisional application No. 60/695,982, filed on Jul. 1, 2005.

(51) Int. Cl.
*H03M 9/00* (2006.01)
(52) U.S. Cl. ...................................... 341/100; 341/101
(58) Field of Classification Search ................ 341/100, 341/101; 370/463, 241, 294; 710/303; 709/328
See application file for complete search history.

(56) References Cited

U.S. PATENT DOCUMENTS

| | | | |
|---|---|---|---|
| 5,030,951 A * | 7/1991 | Eda et al. | 341/100 |
| 5,333,182 A * | 7/1994 | Aoki | 370/294 |
| 6,542,096 B2 * | 4/2003 | Chan et al. | 341/100 |
| 6,567,876 B1 * | 5/2003 | Stufflebeam | 710/303 |
| 7,091,890 B1 * | 8/2006 | Sasaki et al. | 341/100 |
| 2003/0117960 A1 * | 6/2003 | Quinlan et al. | 370/241 |
| 2003/0204645 A1 * | 10/2003 | Sharma et al. | 709/328 |
| 2005/0265377 A1 * | 12/2005 | Mizuno et al. | 370/463 |

* cited by examiner

*Primary Examiner*—Jean B Jeanglaude
(74) *Attorney, Agent, or Firm*—Warren L. Franz; Wade J. Brady, III; Frederick J. Telecky, Jr.

(57) ABSTRACT

A serializer receives parallel data and a control signal. The serializer splits the parallel data into multiple subportions of data and, based on the control signal, sequentially outputs each of said subportions as serial output data in one or more serial output channels. The number of serial output channels is dictated by the control signal.

28 Claims, 3 Drawing Sheets

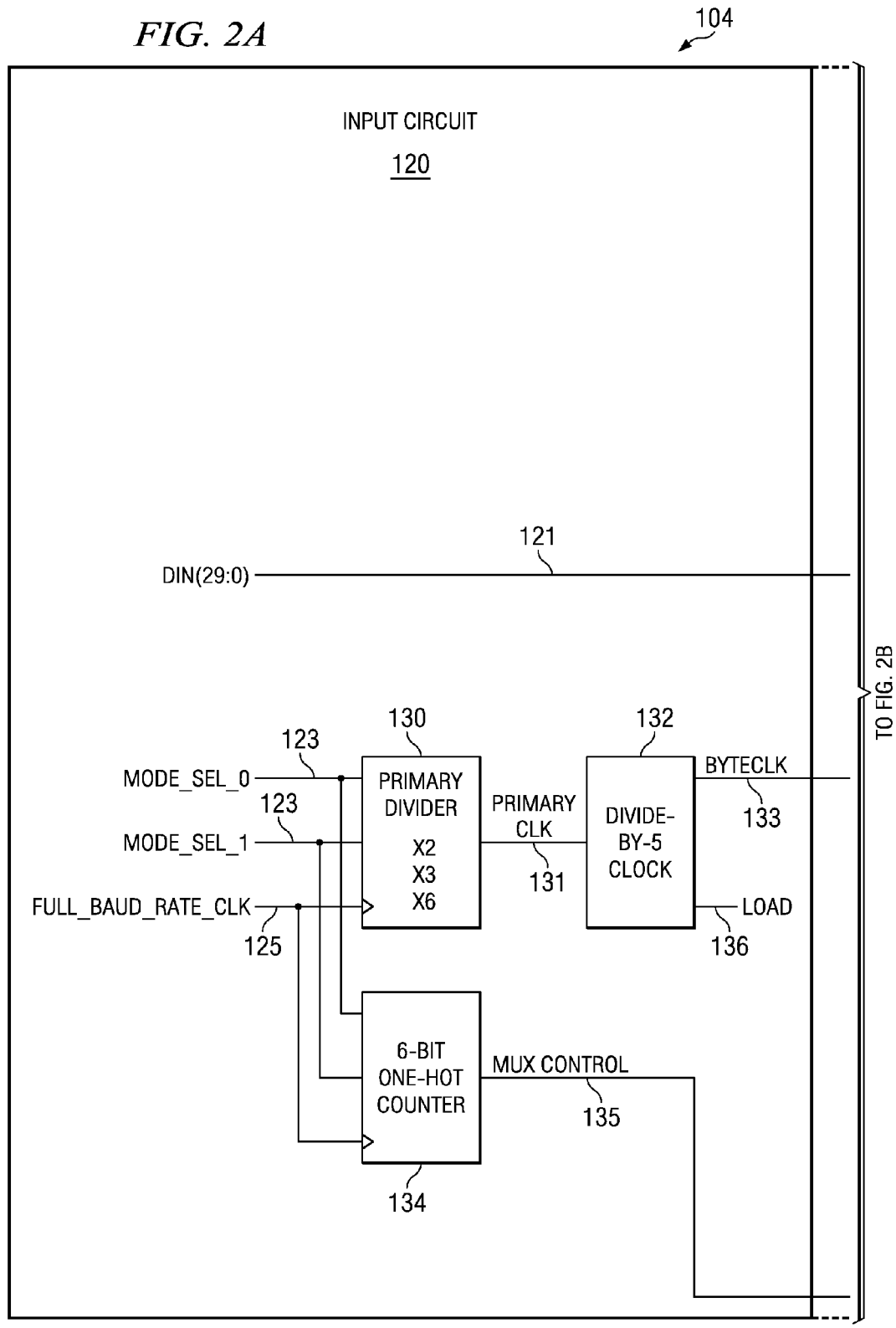

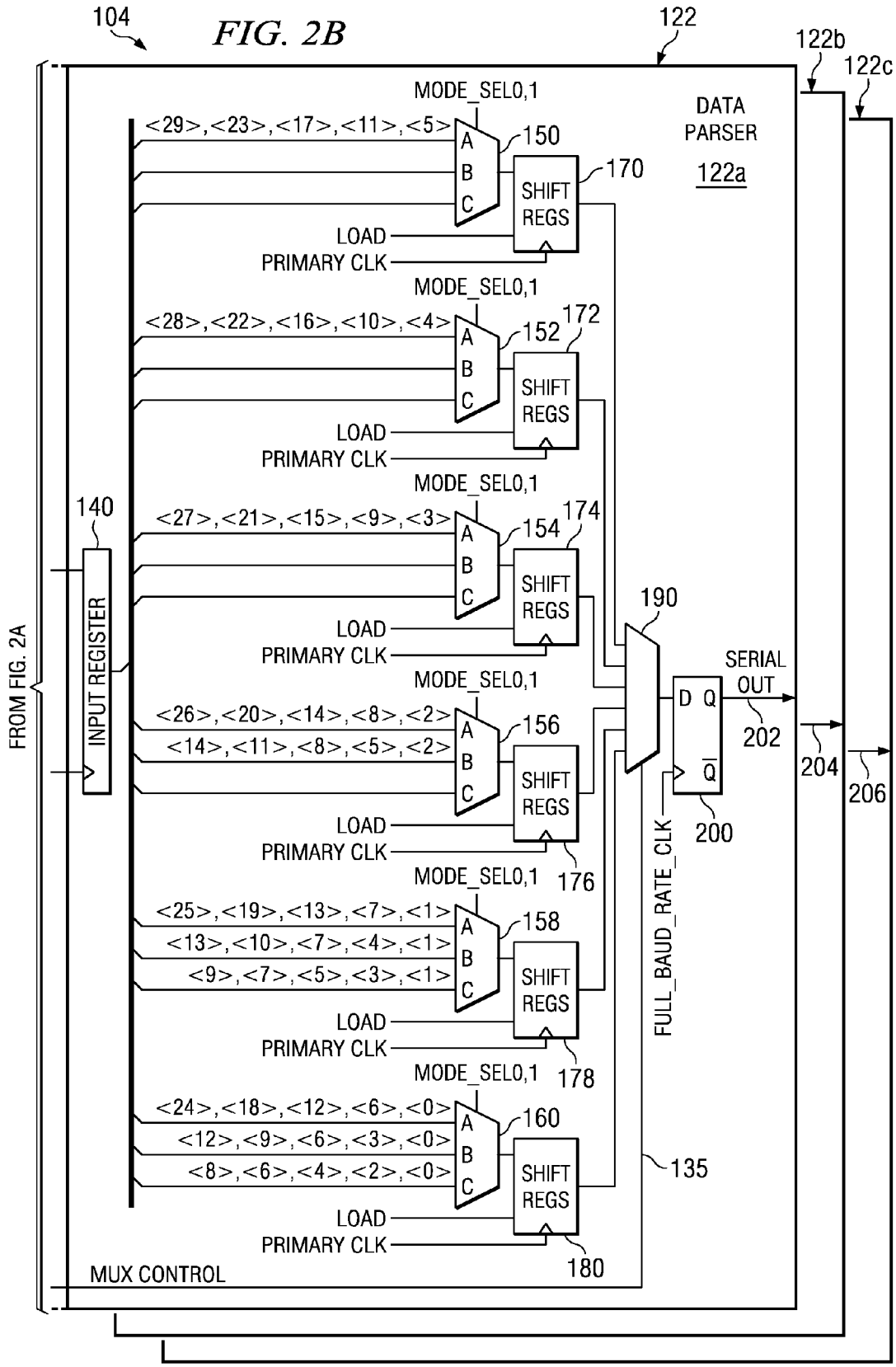

PROGRAMMABLE SERIALIZER FOR A VIDEO DISPLAY

CROSS REFERENCE TO RELATED APPLICATION

This application claims priority to provisional patent application Ser. No. 60/695,982, filed Jul. 1, 2005 and incorporated herein by reference.

BACKGROUND OF THE INVENTION

1. Technical Field

The present disclosure relates generally to a serializer for producing serial data. More particularly, the present disclosure relates to a programmable serializer for producing serial data for a video display.

2. Background Information

In some situations, video data is converted from a parallel format to a serial format. A serializer is a device that converts such parallel data to serial data. An application of a serializer is for a cellular telephone in which the logic (e.g., a processor) that generates the video data and the display on which the video data is provided are provided in two separate parts of the telephone separated by a hinge. That is, the processor is in the main part of the phone and the display is provided in a cover that flips open and shut via a hinge. In such "flip phones," it is desirable to minimize the number of signal conductors that pass through the hinge. By serializing the video data, fewer conductors are needed in the hinge assembly.

The output rate of the serial data produced by a serializer must generally match the consumption rate of the target device. In the context in which the target device is a display, the output data rate of the serializer must generally match the resolution of the display. Most serializers, however, are capable of only a fixed serialization ratio. This limitation means, in turn, that the resolution of the display is limited by the output data rate of the serializer. A manufacturer of the cell phone may be forced to use a different serializer if it is desired to incorporate into the phone a display with a different (e.g., higher) resolution.

BRIEF SUMMARY

In accordance with at least one embodiment, a serializer comprises an input circuit and a plurality of data parsers. The input circuit receives input parallel data and a mode select signal. The serializer generates a control signal based on the mode select signal. Each data parser is configured to split the input parallel data into multiple subportions of data and, based on the control signal, to sequentially output each of the subportions as a serial output data channel. The mode select signal specifies one of a plurality of modes for the serializer. One mode differs from another mode in terms of the number of serial output data channels that are actively provided by the serializer.

In accordance with another embodiment, a serializer receives parallel data and a control signal. The serializer splits the parallel data into multiple subportions of data and, based on the control signal, sequentially outputs each of said subportions as serial output data in one or more serial output channels. The number of serial output channels is dictated by the control signal.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct electrical or wireless connection, or through an indirect electrical or wireless connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
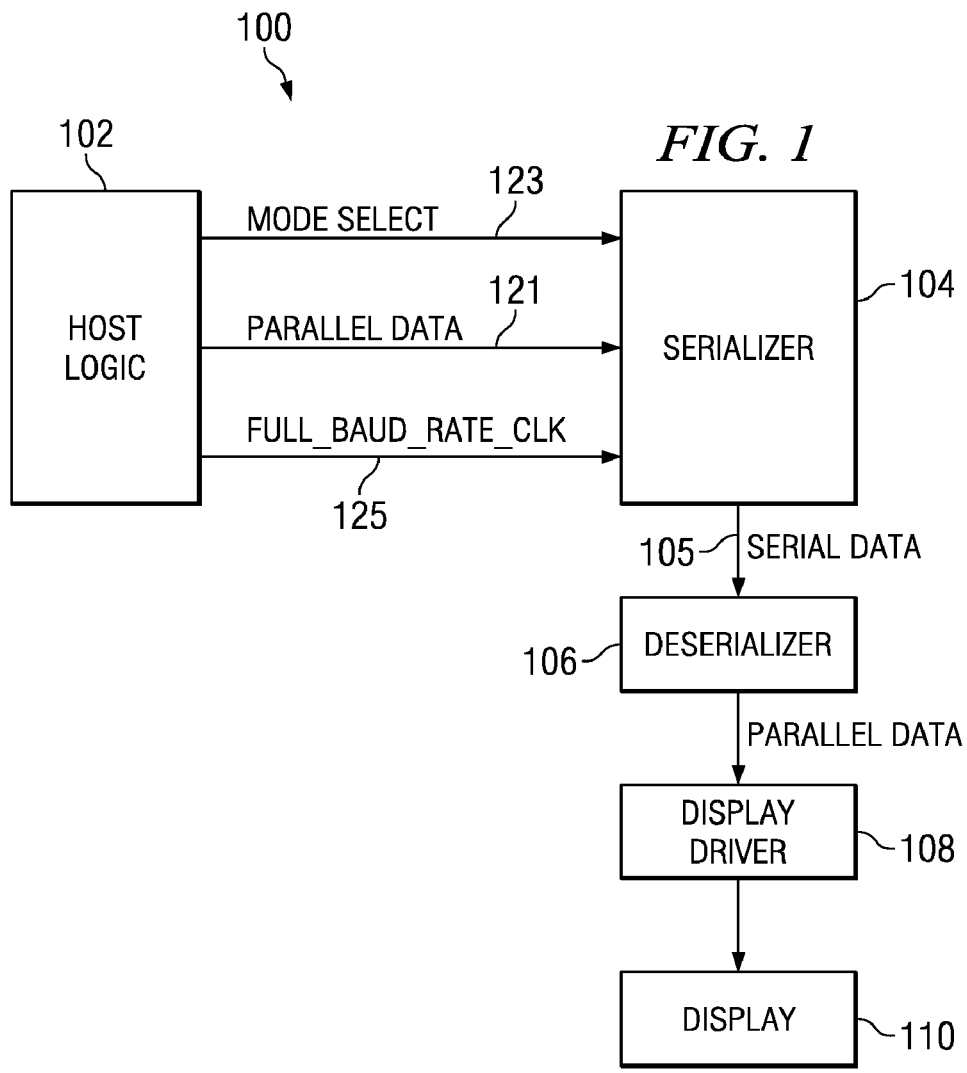
FIG. 1 shows a system containing a serializer in accordance with preferred embodiments of the invention.

FIG. 1 shows a preferred embodiment of a system 100 in accordance with a preferred embodiment of the invention. As shown, system 100 comprises host logic 102, a serializer 104, a deserializer 106, a display driver 108, and a display 110. The host logic 102 comprise a processor or source of video data to be shown on the display 110. The serializer 104 receives parallel video data from the host logic 102 and converts the parallel data to a serial format. The serialized data is then provided over serial link 105 to the deserializer 106 which converts the received serial data back to a parallel format. The parallel data from the deserializer 106 is provided to the display driver 108 which drives display 110.

In some embodiments, the system 100 comprises a cellular telephone. The display 110 comprises any suitable display such as a liquid crystal display (LCD). The serial link 105 may be routed through a hinge assembly (not specifically shown) which couples a first housing structure in which the host logic 102 is housed to a second housing structure in which the display 110 is provided.

Figure 2:
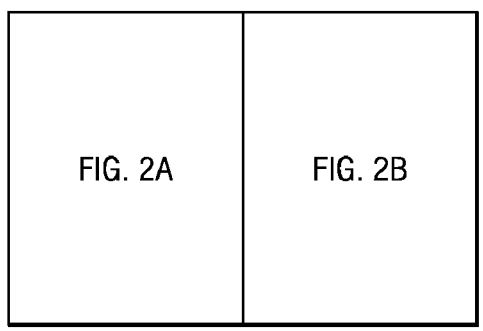
FIG. 2 shows a schematic diagram of the serializer of FIG. 1 in accordance with preferred embodiments of the invention.

FIG. 2 shows a block diagram of the serializer 104. The serializer 104 comprises an input circuit 120 and a data parser 122. The input circuit 120 receives the input parallel data on lines 121, an input control signal 123 and an input clock 125. The parallel input data is a number n=30 bits wide (DIN<29:0>) in the example of FIG. 2 although the width of input parallel data lines 121 can be a number n bits other than 30 bits. The input control signal 123 comprises a pair of mode select signals in the embodiment of FIG. 2. The control signal 123 comprises a mode_sel_0 signal and a mode_sel_1 signal. The serializer 104 of FIG. 2 is capable of being programmed into one of at least three modes of operation and thus two input control signals 123 are provided for that purpose. The two mode_sel_0 and mode_sel_1 signals encode each of the three modes.

In one mode, a single serial output data stream is generated by the serializer 104. This mode is called the "30 bit mode." In another mode, two channels of output data are provided. Each channel comprises a serial output data stream comprising one-half of the 30 input parallel bits (i.e., m=30/2 or 15 bits per channel). This mode is referred to as the "15 bit mode." In this 15 mode, the two serial output data streams run concurrently. That is, 30 bits of data are generated by the serializer 104 in the form of two 15-bit serial data streams running concurrently. In a third mode, three channels of serial data are provided. Each channel comprises 10 bits of the input 30 bit input parallel data (i.e., m=30/3 bits per channel). This mode is referred to as the "10 bit mode." In this 10 bit mode, three concurrently operating 10 bit data streams output the 30 input bits. Moreover, the serial link 105 in FIG. 1 comprises one, two, or three channels of serial data in accordance with the mode select signals 123. Each of the serial channels transmits serial data in accordance with the full_baud_rate_clk signal 125 provided by the host logic.

Although the serial channels transmit in accordance with a fixed clock 125, because the serializer 104 can be programmed to output a single serial channel, or two or three serial channels in parallel, the output serial data of the serializer 104 can be programmed as desired such as in accordance with a resolution of the display 110. In some embodiments, the serializer 104 can be programmed during operation of system 100. In other embodiments, the serializer 104 is not re-programmable during operation. That is, once the system 100 is designed and manufactured, if it is not possible to change the display 110, it would not be necessary to reprogram the output serial data rate of the serializer 104. However, the manufacturer would be able to change the design of the system 100 to use a display with a different resolution and would not have to change the serializer 104 to a different part—the serializer would be programmed (via the mode select signals 123) in the new design to match the resolution of the new display.

Referring still to FIG. 2, the input circuit 120 comprises a primary divider 130, a divide-by-5 132 and a 6-bit one-hot counter 134. The full_baud_rate_clk input clock 125 represents a clock signal having a frequency that comports with the bit rate of the serial data. That is, the output serial data from the serializer 104 is clocked out of the serializer in accordance with the input clock 125—preferably, one serial bit for each cycle of the input clock 125.

The mode_sel_0 and mode_sel_1 signals 123 to the input circuit 120 are provided to the primary divider 130 as is the input clock 125. The mode_sel_0 and mode_sel_1 signals cause the primary divider 130 to divide the input clock 125 by one of three factors to produce an output clock signal designated as "Primary CLK" 131. In one embodiment, such factors comprise a divide-by-2 factor, a divide-by-3, and a divide-by-6 factor. Thus, the Primary CLK 131 represents the input clock 125 divided by 2, 3 or 6 depending on the state of the mode_sel_0 and mode_sel_1 signals.

The Primary CLK signal 131 is provided to the divide-by-5 clock 132 which divides down the Primary CLK by another factor of 5 to produce a "BYTECLK" signal 133 and a LOAD signal 136. The BYTECLK 133 and LOAD 136 thus each represent the input clock 125 divided by a factor of 10, 15, or 30.

The 6-bit one-hot counter 134 also receives the mode_sel_0 and mode_sel_1 signals and input clock 125. The counter 134 generates multiple mux control signals which are used to form the output serial data as will be explained above.

The data parser 122 comprises an input register 140, a plurality of multiplexers 150-160 and a plurality of 5-bit shift registers 170-180. In the illustrative embodiment of Figure, there is one shift register 170-180 for each multiplexer 150-160 as shown. The outputs of the shift registers are provided to an output multiplexer 190 which, in turn couples to an output latch 200. The output of latch 200 comprises serial output data.

The data parser 122 comprises three data parsers 122a, 122b, and 122c. Each data parser provides one of the three output serial channels explained above. Thus, data parser 122a provides an output serial channel 202, while data parsers 122b and 122c provide output serial channels 204 and 206, respectively. In the 30-bit mode, only data parser 122a and its output serial channel 202 are used to provide a single channel of serial data from the serializer 104. In the 15-bit mode, both data parsers 122a and 122b and their output serial channels 202 and 204 are used to provide two concurrently operating serial output channels. In the 30-bit mode, all three data parsers 122a-122c and their output serial channels 202-206 are used to provide three concurrently operating serial output channels.

The parallel input data 131 is stored in input register 140 under control of the BYTECLK signal 133. From the input register, the input parallel data is split into multiple subportions of data. In general, the data parser 122, based on the control signal, sequentially outputs each of said subportions as serial output data. More specifically, the input parallel data from the input register 140 is broken apart and provided to more than one of the multiplexers 150-160. Each multiplexer 150-160 comprises three input channels as shown and operates in accordance with the two mode_sel_0 and mode_sel_1 signals. The two mode_sel_0 and mode_sel_1 signals select one of the three multiplexer inputs to provide as an output of the multiplexer to the corresponding shift register 170-180. Each shift register 170-180 serially clocks in the bits for the multiplexers in accordance with the Primary CLK signal 131. Each shift register preferably is a 5-bit shift register. The outputs from the shift registers are provided to output multiplexer 190 which is controlled by mux control signals 135. The mux control signals 135 specify which input bit on the 6 inputs of multiplexer 190 to provide as a serial output bit to the latch 200.

FIG. 2 also illustrates a preferred bit assignments of each of the 30 input bits for the 30-bit, 15-bit and 10-bit modes. For convenience, the three input channels of the multiplexers 150-160 are designated as A, B, and C as shown for multiplexer 150. The top input will be called input A, while the middle and bottom inputs will be called inputs B and C, respectively.

For the 30-bit mode, only input A of each of the six multiplexers 150-160 is used. With 30-bits of parallel input data, each of the six multiplexers receives five of the 30 bits on their A inputs. The bit assignments for each of the multiplexers are provided in Table I below. Only the shift registers of one of the data parsers (e.g., 122*a*) are used in the 30-bit mode. As shown in Table 1, all 30 bits are allocated among the six shift registers.

TABLE 1

30-bit mode mapping

| MODE | MULTIPLEXERS | BIT ASSIGNMENT |
|---|---|---|
| 30-bit Mode | 150 (parser 122a) | <29>, <23>, <17>, <11>, <5> |
| | 152 (parser 122a) | <28>, <22>, <16>, <10>, <4> |
| | 154 (parser 122a) | <27>, <21>, <15>, <9>, <3> |
| | 156 (parser 122a) | <26>, <20>, <14>, <8>, <2> |
| | 158 (parser 122a) | <25>, <19>, <13>, <7>, <1> |
| | 160 (parser 122a) | <24>, <18>, <12>, <6>, <0> |

For the 15-bit mode, data parsers 122*a* and 122*b* are used. However, only three of the shift registers in each of the data parsers are used. For example, only shift registers 156, 158, and 160 are used. For each such shift register, two inputs A and B are used to receive input bits. With 30 input data bits to allocate among two data parser, each parser receives 15 bits. With 15 bits per parser and three shift registers being used per parser, each shift register receives five bits. Table 2 provides an illustrative bit assignment for data parsers 122*a* and 122*b* in the 15-bit mode.

TABLE 2

15-bit mode mapping

| MODE | MULTIPLEXERS | BIT ASSIGNMENT |
|---|---|---|
| 15-bit Mode | 150 (parser 122a) | Not used |
| | 152 (parser 122a) | Not used |
| | 154 (parser 122a) | Not used |
| | 156 (parser 122a) | <14>, <11>, <8>, <5>, <2> |
| | 158 (parser 122a) | <13>, <10>, <7>, <4>, <1> |
| | 160 (parser 122a) | <12>, <9>, <6>, <3>, <0> |
| | 150 (parser 122b) | Not used |
| | 152 (parser 122b) | Not used |
| | 154 (parser 122b) | Not used |
| | 156 (parser 122b) | <29>, <26>, <23>, <20>, <17> |
| | 158 (parser 122b) | <28>, <25>, <22>, <19>, <16> |
| | 160 (parser 122b) | <27>, <24>, <21>, <18>, <15> |

For the 10-bit mode, all three data parsers 122*a*-122*c* are used. However, only two of the shift registers in each of the data parsers are used. For example, only shift registers 158 and 160 are used. For each such shift register, all three inputs A, B and C are used to receive input bits. With 30 input data bits to allocate among three data parser, each parser receives 10 bits. With 10 bits per parser and two shift registers being used per parser, each shift register receives five bits. Table 3 provides an illustrative bit assignment for data parsers 122*a*, 122*b*, and 122*c* in the 10-bit mode.

TABLE 3

10-bit mode mapping

| MODE | MULTIPLEXERS | BIT ASSIGNMENT |
|---|---|---|
| 10-bit Mode | 150 (parser 122a) | Not used |
| | 152 (parser 122a) | Not used |
| | 154 (parser 122a) | Not used |
| | 156 (parser 122a) | Not used |
| | 158 (parser 122a) | <9>, <7>, <5>, <3>, <1> |
| | 160 (parser 122a) | <8>, <6>, <4>, <2>, <0> |
| | 150 (parser 122b) | Not used |
| | 152 (parser 122b) | Not used |
| | 154 (parser 122b) | Not used |
| | 156 (parser 122b) | Not used |
| | 158 (parser 122b) | <19>, <17>, <15>, <13>, <11> |
| | 160 (parser 122b) | <19>, <16>, <14>, <12>, <10> |
| | 150 (parser 122c) | Not used |
| | 152 (parser 122c) | Not used |
| | 154 (parser 122c) | Not used |
| | 156 (parser 122c) | Not used |
| | 158 (parser 122c) | <29>, <27>, <25>, <23>, <21> |
| | 160 (parser 122c) | <28>, <26>, <24>, <22>, <20> |

With the bits allocated to the multiplexers 150-160 as described above, the bits from the relevant shift registers (note: not all shift registers are used in every mode), are shifted through the shift registers 170-180. The output of each shift register 170-180 comprises a single bit and is provided to output multiplexer 190. The serial output data stream 202-206 of each of the data parsers 202*a*-202*c* is provided by the output multiplexer under control of the mux control signals 135 which sequentially select each of the relevant shift register outputs to generate a properly ordered output serial bit stream. For the 30-bit mode, the mux control signals 135 sequentially select the output bit from each of the six shift registers 170-180 of data parser 122*a*. For the 15-bit mode, the mux control signals 135 sequentially select the output bit from each of the three shift registers 176-180 of each of data parsers 122*a* and 122*b*. For the 10-bit mode, the mux control signals 135 sequentially select the output bit from each of the two shift registers 178-180 of each of data parsers 122*a*-122*c*.

The serializer 104 of the preferred embodiment is thus capable of 1, 2, or 3 output serial channels. A system designer may choose for serial link 105 to include only a single serial channel or two serial channels or three serial channels. That is, not all three serial channels need actually be wired up. With the serializer 104 described herein, if a system designer chooses to have two or three serial channels wired up across link 105, the serializer 104 can be dynamically programmed (i.e., programmed during operation) to generate serial data on 1 or 2 serial channels in the case in which conductors for two serial channels are included in link 105. In the case in which conductors for three serial channels are included in link 105, the serializer can be dynamically programmed to generate data for 1, 2, or 3 serial channels.

While the preferred embodiments of the present invention have been shown and described, modifications thereof can be made by one skilled in the art without departing from the spirit and teachings of the invention. The scope of protection is not limited by the description set out above. Each and every claim is incorporated into the specification as an embodiment of the present invention.

What is claimed is:

1. A serializer for converting input parallel data to one or more concurrent output serial data streams, in accordance with a selected mode of operation, the serializer comprising:
    an input circuit that receives n bits wide input parallel data and a mode select signal, and that generates a control signal based on the mode select signal; and
    a plurality of data parsers coupled to said input circuit, each data parser configured to split said input parallel data into multiple subportions of data and, based on said control signal and mode select signal, to sequentially output each of said subportions as a single n-bit serial output data stream or as a plurality of concurrent m-bit data streams, with m=n/number of data streams;

wherein said mode select signal specifies one of a plurality of modes for said serializer, one mode differing from another mode in terms of the number of serial output data streams that are provided.

2. The serializer of claim 1 wherein said input circuit comprises a frequency divider that divides down an input clock based on the mode select signal.

3. The serializer of claim 1 wherein each data parser comprises an input register into which input parallel data is stored.

4. The serializer of claim 1 wherein each data parser comprises a plurality of shift registers, each shift register receiving some, but not all, of the input parallel data.

5. The serializer of claim 4 wherein each data parser comprises an output multiplexer that, under control of said control signal, selects an output from each of the shift registers to form the serial output data channel.

6. The serializer of claim 1 further wherein the serializer comprises at least three data parsers and said mode select signal causes the serializer to output one, two or three concurrent streams of serial output data in accordance with the mode select signal.

7. The serializer of claim 1 wherein the input parallel data comprises video data.

8. A system, comprising:
a processor; and
a serializer that receives n bits parallel data and a control signal from said processor and splits said parallel data into multiple subportions of data and, based on said control signal, sequentially outputs each of said subportions as serial output data in one or more concurrent serial output channels, the number and bit size of the serial output channels dictated by said control signal.

9. The system of claim 8 wherein said serializer comprises a frequency divider that divides down an input clock based on a mode encoded by way of an input mode select signal.

10. The system of claim 8 wherein said serializer comprises a plurality of data parsers and each data parser comprises an input register into which input parallel data is stored.

11. The system of claim 8 wherein said serializer comprises a plurality of data parsers and wherein each data parser comprises a plurality of shift registers, each shift register receiving some, but not all, of the input parallel data.

12. The system of claim 11 wherein each data parser comprises an output multiplexer that, under control of said control signal, selects an output from each of the shift registers to form the serial output data channel.

13. The system of claim 8 further wherein the serializer comprises at least three data parsers and said control signal causes the serializer to output one, two or three channels of serial output data in accordance with the control signal.

14. The system of claim 8 wherein the parallel data comprises video data.

15. The serializer of claim 1:
wherein the serializer comprises at least three data parsers and said mode select signal causes the serializer to output one, two or three concurrent streams of serial output data in accordance with the mode select signal;
wherein the input circuit comprises a frequency divider that divides down an input clock based on the mode select signal; and
wherein each data parser comprises an input register into which input parallel data is stored; a plurality of shift registers, each shift register receiving some, but not all, of the input parallel data; and an output multiplexer that, under control of said control signal, selects an output from each of the shift registers to form the serial output data channel.

16. The system of claim 8 wherein the serializer further comprises:
a frequency divider that divides down an input clock based on a mode encoded by way of an input mode select signal; and
at least three data parsers, each data parser including: an input register into which input parallel data is stored; a plurality of shift registers, each shift register receiving some, but not all, of the input parallel data; an output multiplexer that, under control of said control signal, selects an output from each of the shift registers to form the respective serial output data channel; and
wherein the control signal causes the serializer to output one, two or three channels of serial output data in accordance with the control signal.

17. A serializer for converting input parallel data to output serial data, in accordance with a selected one of at least of three modes of operation: a first mode for generating a single serial output data stream; a second mode for generating two concurrent serial output data streams; and a third mode for generating three concurrent serial output data streams; each data stream being generated in accordance with clocking based on an input clock signal; the serializer comprising:
circuitry for providing clock signals corresponding to first and second subdivisions of the input clock signal according to the selected mode of operation;
circuitry for providing control signals according to the selected mode of operation; and
a data parser having at least three data parsing channels, each channel providing a respective one of the serial output data streams, and including:
an input register for receiving the input parallel data and for splitting the input parallel data into multiple subportions of data according to the selected mode of operation and according to the clock signal corresponding to the second subdivision of the input clock signal;
a plurality of multiplexers for respectively receiving the subportions of data from the input register in at least three input channels, respectively corresponding to the available modes of operation;
a plurality of shift registers, respectively coupled to the plurality of multiplexers to receive a selected one of the input channels corresponding to the selected mode of operation and according to the clock signal corresponding to the first subdivision of the input clock signal; and
an output circuit coupled to receive a selected one of the outputs of the shift registers, and provide an output data stream, under control of the control signals;
whereby bits of input data are allocated to input channels of the plurality of multiplexers and shifted through the shift registers to the output multiplexer to provide a properly ordered output serial bit data stream under control of the control signals, for one or more data parser channels corresponding to the number of concurrent serial output data streams for the selected mode of operation.

18. The serializer of claim 17, wherein the circuitry for providing clock signals comprises a divider connected to receive and divide the input clock signal by a factor determined based on the selected mode of operation.

19. The serializer of claim 17, wherein the circuitry for providing clock signals comprises a first divider connected to receive and divide the input clock signal by a first factor determined based on the selected mode of operation to provide a signal corresponding to the first subdivision of the input clock signal; and a second divider connected to receive and divide the first subdivision signal by a second factor to provide a signal corresponding to the second subdivision of the input clock signal.

20. The serializer of claim 17, wherein the circuitry providing control signals according to the selected mode of operation comprises a one-hot counter.

21. The serializer of claim 17, wherein the output circuit comprises an output multiplexer coupled to receive the outputs of the shift registers; and an output latch coupled to receive a selected one of the outputs of the shift registers from the output multiplexer under control of the control signals.

22. The serializer of claim 17:
wherein the circuitry for providing clock signals comprises a first divider connected to receive and divide the input clock signal by a first factor determined based on the selected mode of operation to provide a signal corresponding to the first subdivision of the input clock signal; and a second divider connected to receive and divide the first subdivision signal by a second factor to provide a signal corresponding to the second subdivision of the input clock signal;
wherein the circuitry providing control signals according to the selected mode of operation comprises a one-hot counter; and
wherein the output circuit comprises an output multiplexer coupled to receive the outputs of the shift registers; and an output latch coupled to receive a selected one of the outputs of the shift registers from the output multiplexer under control of the control signals.

23. The serializer of claim 22, in the form of a serializer for converting 30 bits wide input parallel data into one, two or three concurrent serial output data streams, corresponding to a programmable 30 bit, 15 bit or 10 bit mode of operation,
wherein the first divider is connected to receive and divide the input clock signal by a factor of 2, 3 or 6;
wherein the second divider is a divide-by-5 circuit;
wherein the one-hot counter is a 6-bit one-hot counter;
wherein the plurality of multiplexers comprises six multiplexers; and
wherein the shift registers are 5-bit shift registers;
whereby, in the 30 bit mode of operation, one of the data parsing channels provides an output data stream comprising all of the 30 input parallel bits; in the 15 bit mode of operation, two of the data parsing channels provide concurrent output data streams, each comprising half of the 30 input parallel bits; and, in the 10 bit mode of operation, three of the data parsing channels provide concurrent output data streams, each comprising one-third of the 30 input parallel bits.

24. Apparatus including a serializer for converting input parallel data to output serial data, the serializer being programmable, responsive to an input control signal, to provide one of at least of three modes of operation: a first mode for generating a single serial output data stream; a second mode for generating two concurrent serial output data streams; and a third mode for generating three concurrent serial output data streams; each data stream being generated in accordance with clocking based on an input clock signal; the serializer comprising:
an input circuit for receiving the input parallel data, the input control signal, and the input clock signal; the input circuit comprising:
a first divider connected to receive and divide the input clock signal by a factor selected responsive to the input control signal to provide a primary clock signal;
a second divider connected to receive and divide the primary divider output clock signal by a given fixed factor n to provide a byte clock signal and a load signal;
a one-hot counter connected to receive the input control signal and the input clock signal and to generate multiple mux control signals responsive thereto;
a data parser comprising at least three data parsing channels, each channel providing a respective serial output data stream and including:
an input register for receiving and storing the input parallel data under control of the byte clock signal; and for splitting the input parallel data into multiple subportions of data;
a plurality of multiplexers for respectively receiving the subportions of data from the input register in at least three input channels;
a plurality of shift registers, respectively coupled to the plurality of multiplexers to receive a selected one of the input channels under control of the control signal, and in accordance with the primary clock signal and load signals;
an output multiplexer coupled to receive the outputs of the shift registers; and
an output latch coupled to receive a selected one of the outputs of the shift registers from the output multiplexer under control of the mux control signals, and provide an output data stream clocked in accordance with the input clock signal;
whereby bits of input data are allocated to input channels of the plurality of multiplexers and shifted through the shift registers to the output multiplexer to provide a properly ordered output serial bit data stream under control of the mux control signals, for one or more data parser channels corresponding to the number of concurrent serial output data streams for the programmed mode of operation.

25. The apparatus of claim 24, in the form of a serializer for converting 30 bits wide input parallel data into one, two or three concurrent serial output data streams, corresponding to a programmable 30 bit, 15 bit or 10 bit mode of operation,
wherein the first divider is connected to receive and divide the input clock signal by a factor of 2, 3 or 6, selected based on the input control signal;
wherein the second divider is a divide-by-5 circuit;
wherein the one-hot counter is a 6-bit one-hot counter;
wherein the plurality of multiplexers comprises a plurality of six multiplexers; and
wherein the shift registers are 5-bit shift registers;
whereby, in the 30 bit mode of operation, one of the data parsing channels provides an output data stream comprising all of the 30 input parallel bits; in the 15 bit mode of operation, two of the data parsing channels provide concurrent output data streams, each comprising half of the 30 input parallel bits; and, in the 10 bit mode of operation, three of the data parsing channels provide concurrent output data streams, each comprising one-third of the 30 input parallel bits.

26. The apparatus of claim 24, further comprising:
host logic for providing input parallel data in the form of parallel video data to the serializer; the serializer converting the parallel video data to a serial format;
a deserializer coupled to the serializer for converting the serial format data back to a parallel format;
a display driver coupled to receive the parallel format data from the deserializer;
a display coupled to be driven by the display driver.

27. The apparatus of claim 26 in the form of a cellular telephone, including a first housing structure housing the host logic and serializer; a second housing structure connected to the first housing structure by a hinge assembly and housing the deserializer and display; and a serial link routed through the hinge assembly to provide the serial format data from the serializer to the deserializer.

28. The apparatus of claim 24, wherein the serializer can be reprogrammed during operation, to match the resolution of a new display.

* * * * *